(12) United States Patent
Steury et al.

(10) Patent No.: US 7,758,103 B1
(45) Date of Patent: Jul. 20, 2010

(54) HYDRAULIC LIFT FOR TOP OF MOBILE LIVING QUARTERS

(76) Inventors: Mathew Steury, 19405 Eldorado Dr., Goshen, MI (US) 46526; Edwin Steury, 58096 Cobblestone Rd., Goshen, IN (US) 46528

( * ) Notice: Subject to any disclaimer, the term of this patent is extended or adjusted under 35 U.S.C. 154(b) by 440 days.

(21) Appl. No.: 11/772,367

(22) Filed: Jul. 2, 2007

Related U.S. Application Data

(60) Provisional application No. 60/806,677, filed on Jul. 6, 2006.

(51) Int. Cl.
*B60P 3/355* (2006.01)
(52) U.S. Cl. ............... 296/156; 296/173; 296/26.05
(58) Field of Classification Search ............. 296/156, 296/164, 165, 168, 171, 172, 173, 175, 176, 296/26.01, 26.04, 26.05; 254/45
See application file for complete search history.

(56) References Cited

U.S. PATENT DOCUMENTS

| | | | |
|---|---|---|---|
| 2,146,193 A | 2/1939 | Rippe | |
| 2,747,372 A | 5/1956 | York | |
| 2,836,455 A * | 5/1958 | Hathaway | 296/10 |
| 3,061,358 A * | 10/1962 | Lien | 296/26.05 |
| 3,265,357 A | 8/1966 | Schilling | |
| 3,363,932 A * | 1/1968 | Mann | 296/164 |
| 3,494,655 A * | 2/1970 | Linton | 296/168 |
| 3,506,300 A | 4/1970 | Remmert | |
| 3,507,535 A | 4/1970 | Wallace | |
| 3,762,759 A * | 10/1973 | Hall | 296/164 |
| 3,802,732 A * | 4/1974 | McKee | 296/176 |
| 4,092,039 A * | 5/1978 | Lutkenhouse | 296/26.05 |
| 4,103,958 A * | 8/1978 | Parent | 296/165 |
| 4,171,843 A | 10/1979 | Steury | |
| 4,351,153 A | 9/1982 | Kosmala | |
| 4,363,380 A | 12/1982 | Rued et al. | |
| 4,448,453 A * | 5/1984 | Irelan et al. | 296/156 |
| 4,815,786 A * | 3/1989 | McRay | 296/165 |
| 4,930,071 A | 5/1990 | Wilson | |
| 5,400,863 A * | 3/1995 | Richardson | 180/53.4 |
| 5,485,798 A | 1/1996 | Samoian et al. | |
| 5,505,515 A * | 4/1996 | Turner | 296/173 |
| 5,890,835 A | 4/1999 | Basta et al. | |
| 5,951,096 A | 9/1999 | Steury et al. | |
| 6,026,934 A | 2/2000 | Deurloo | |
| 6,126,220 A * | 10/2000 | Brasher | 296/26.04 |
| 6,206,456 B1 | 3/2001 | Steury et al. | |
| 6,209,944 B1 * | 4/2001 | Billiu et al. | 296/100.02 |
| 6,302,475 B1 * | 10/2001 | Anderson | 296/175 |

(Continued)

*Primary Examiner*—Glenn Dayoan
*Assistant Examiner*—Gregory Blankenship
(74) *Attorney, Agent, or Firm*—Botkin & Hall, LLP

(57) ABSTRACT

A hydraulic lift for mobile living quarters having a liftable top. A fluid pressure source communicates fluid through fluid lines connected to a plurality of lifting members that extend upon receipt of fluid and retract upon discharging fluid. The rate at which fluid is discharged from the lifting members is a function of how much weight each lifting member bears. Each of the fluid lines has a flow control valve between the pressure source and each lifting member. Fluid is communicated through the flow control valve to the lifting member connected to the pressure source the fluid is also communicated through the flow control valve when fluid is discharged from the lifting member. The flow control valve limits the flow rate of the fluid to a constant predetermined rate when the fluid is discharged from the lifting member.

9 Claims, 19 Drawing Sheets

U.S. PATENT DOCUMENTS

| | | |
|---|---|---|
| 6,443,516 B2 | 9/2002 | Lambright |
| 6,527,336 B2 * | 3/2003 | Hernandez et al. ....... 296/182.1 |
| 6,575,514 B2 * | 6/2003 | McManus et al. ........ 296/26.01 |
| 6,981,729 B2 | 1/2006 | Steury et al. |

* cited by examiner

HYDRAULIC LIFT FOR TOP OF MOBILE LIVING QUARTERS

CROSS REFERENCE TO RELATED APPLICATIONS

This application claims the benefit and priority of U.S. Provisional Patent Application Ser. No. 60/806,677, filed Jul. 6, 2006, the subject matter of which is hereby incorporated by reference.

BACKGROUND OF THE INVENTION

Camping trailers have long been provided with lift mechanisms for raising and lowering the top. Some lifts use telescoping corner posts to accomplish this task.

U.S. Pat. No. 3,363,932 uses a single pumping piston which supplies four separate hydraulic cylinders in four corner posts and has adjustable valves to allow each of the corner posts to descend at an equal rate to the other posts. The valves restrict the flow of fluid returning from the hydraulic cylinders in the corner posts, which adjusts the rate of descent for the cylinder in line with the adjustable valve. If the posts do not descend evenly, binding and excessive wear can occur. In use the weight of the camper top would almost never be evenly distributed to all of the posts. There would almost certainly be some posts which would carry more weight than others. Generally a post with more weight will descend faster than a post with less weight. To compensate for this a user of this disclosed invention would have to adjust each of the four individual valves through trial and error to restrict fluid flow from the individual cylinders in the corner posts until they all descended at the same rate. If a user guessed wrong in his adjustment of one or more of the posts, the camper could bind due to an uneven rate of descent. Also, if the weight distribution changed in any way due to different loading conditions, a user would have to readjust the valves. It is unsafe and unreasonable to expect a consumer to properly adjust the valves each time the camper top is raised or lowered.

SUMMARY OF THE INVENTION

The present invention is a liftable top for mobile living quarters. The top is supported by lifting members which are a piston retained in a cylinder. The lifting members extend when receiving fluid and retract when fluid is discharged from the lifting members. Fluid is discharged at a rate which is a function of the weight borne by the lifting member. A pump communicates fluid to the lifting members through fluid lines. Each fluid line connected to the lifting members has a flow control valve therein. Each line also has a release valve to allow fluid to be discharged from the lifting members. The release valves may be contained in the pump or in the fluid lines. In either case, the release valves are operated simultaneously to allow fluid to be discharged from the lifting members, thereby lowering the top. As the top lowers, flow control valves limit the fluid discharged from the lifting members to a predetermined flow rate. This causes the lifting members to lower the top evenly despite different weight borne by each lifting member.

DETAILED DESCRIPTION OF INVENTION

The hydraulic lift of this invention is used to lift a structure. This structure may be any structure that requires uniform lifting, as well as uniform and controlled descent. The embodiment detailed as follows, pertains to a camper 30, but may be used for boat lifts, work benches, tables, etc.

Figure 18:
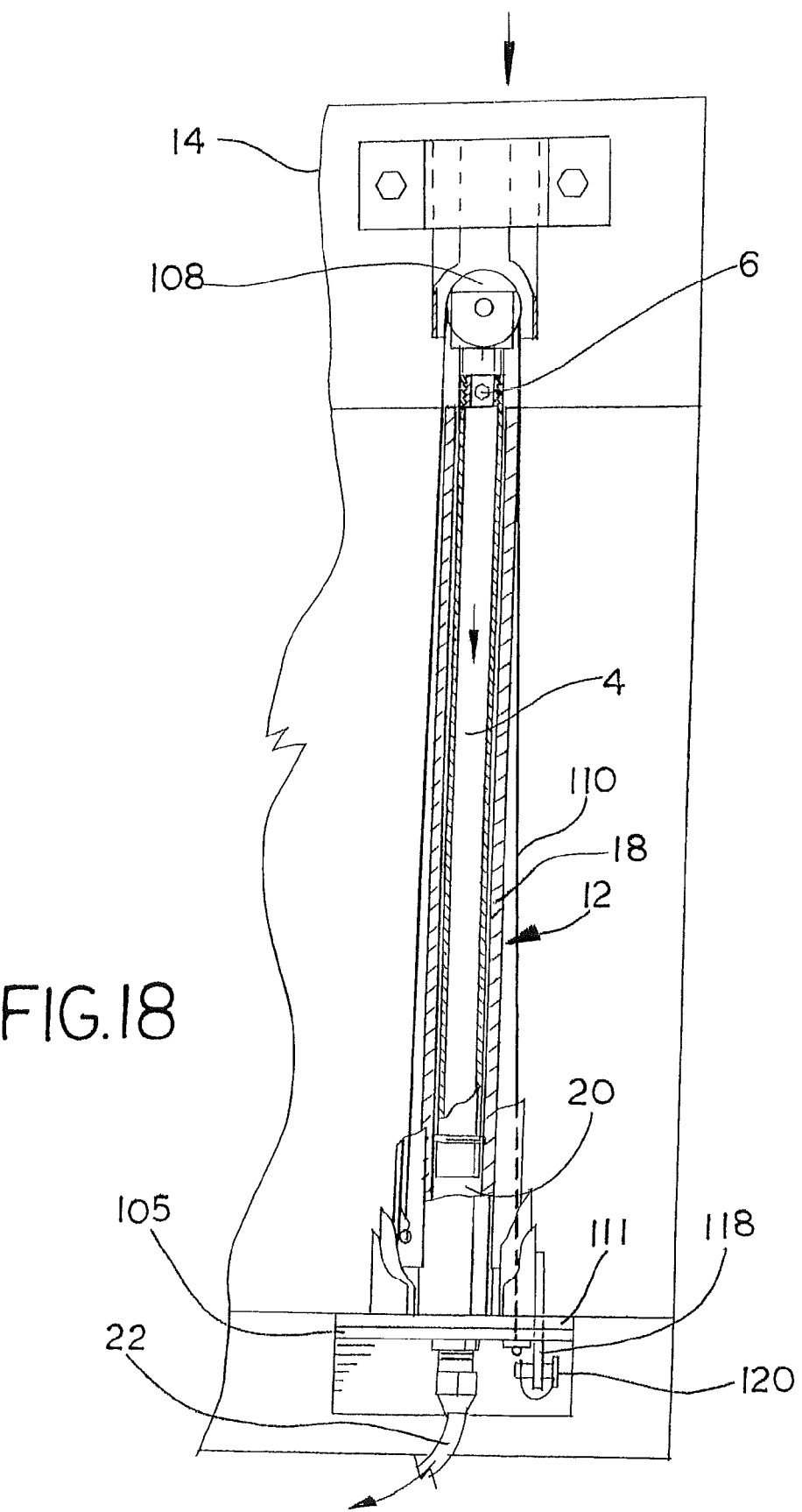
FIG. 18 is a section view of a lifting member shown in FIGS. 16 and 17.
Figure 19:
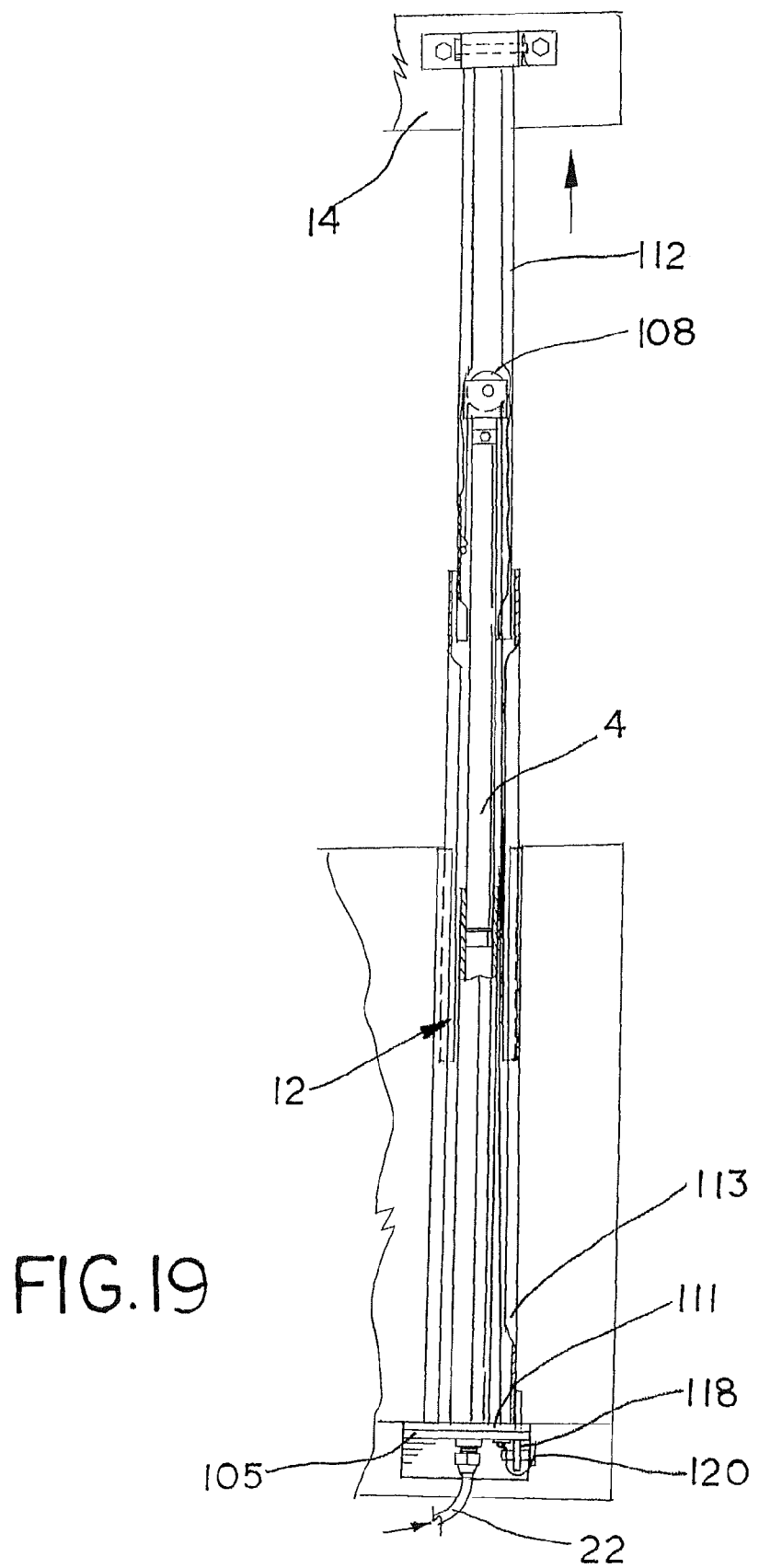
FIG. 19 is a partial section view of a lifting member fully extended.

The hydraulic lift of this invention has four lifting members 12 that are placed near corners of a camper top 14. The lifting members 12 have a piston 16 and a cylinder 18. The piston 16 and cylinder 18 form a chamber 20 that receives fluid through a fluid line 22. The piston 16 may have a bore 4 running its entire length, as shown in FIG. 18, that is capped with a threaded plug 6. This allows bleeding of air form the chamber 20 when hydraulic fluid is used as the fluid. When the piston 16 has a bore 4, as shown in FIG. 18, the piston 16 is preferably a rod having the same diameter along its entire length. When fluid is forced into the chamber 20 through the fluid line 22 the lifting member 12 extends, as fluid leaves the chamber 20 the lifting member 12 retracts. The rate that fluid leaves the chamber 20 of the lifting member 12 is a function of the weight borne by the lifting member 12. When more weight is borne by the lifting member 12, fluid will leave at a faster rate.

Figure 1:
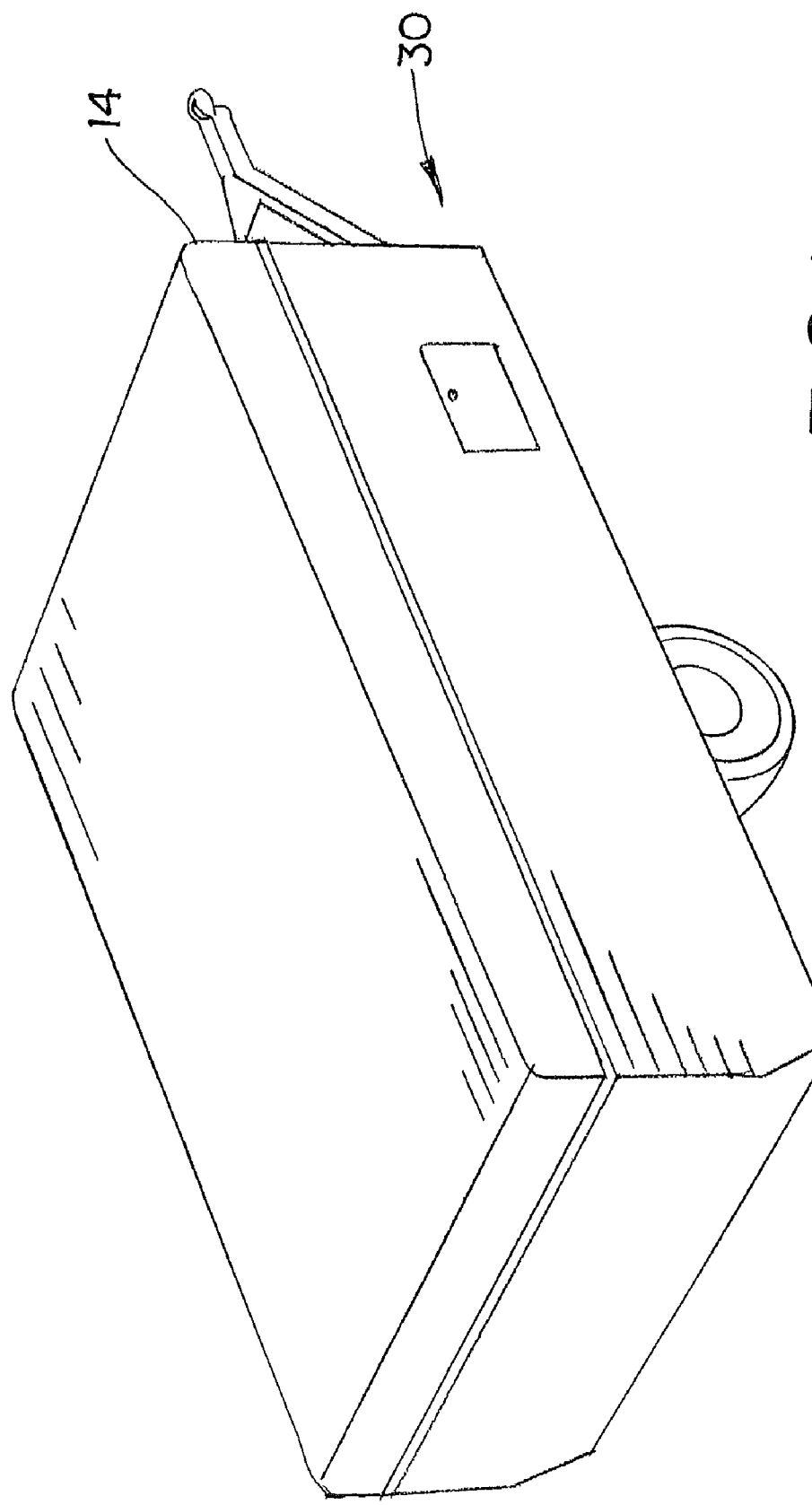
FIG. 1 is a perspective view of a camper with a liftable top.
Figure 2:
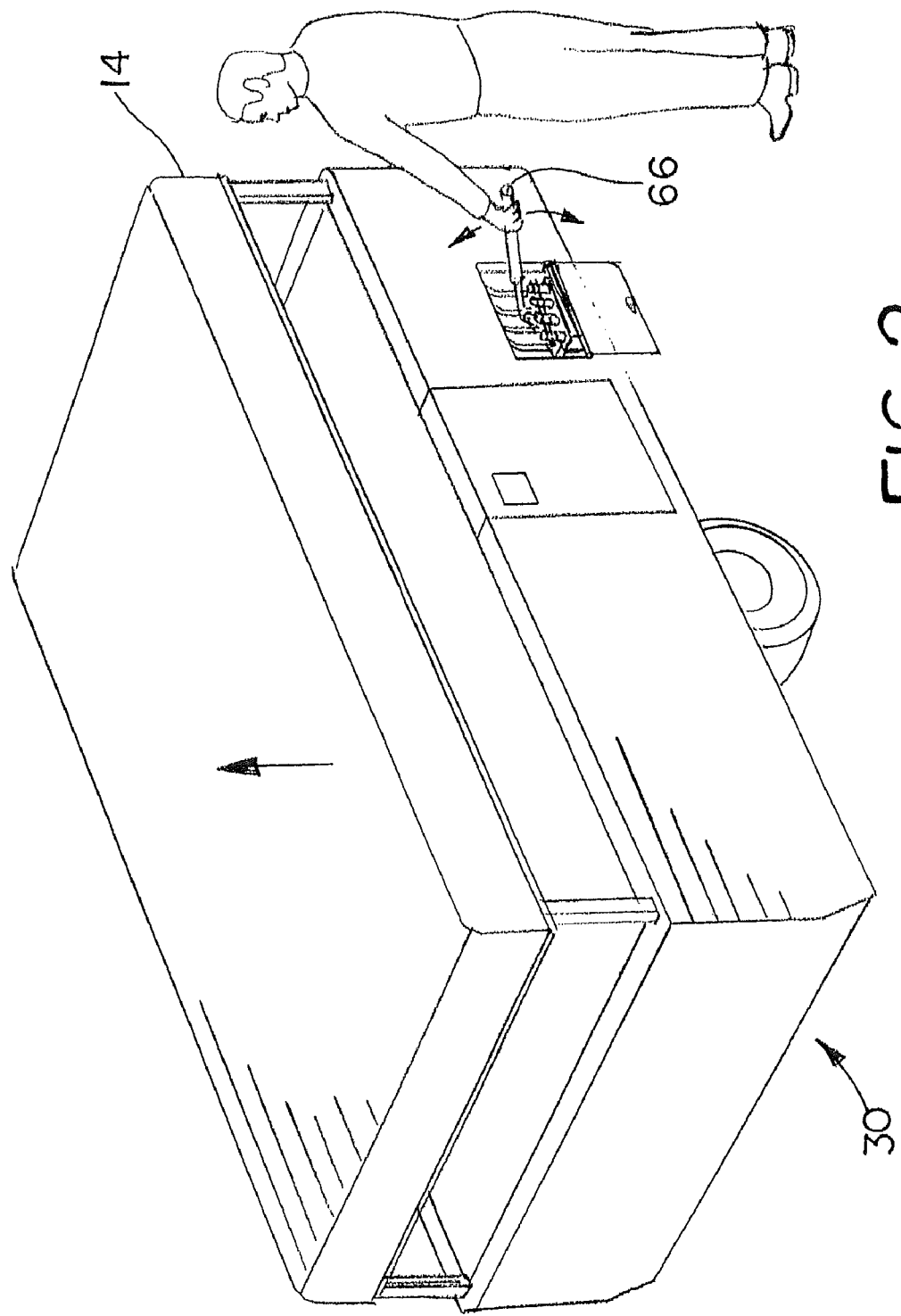
FIG. 2 is a perspective view of the camper shown in FIG. 1 with the top partially raised.
Figure 3:
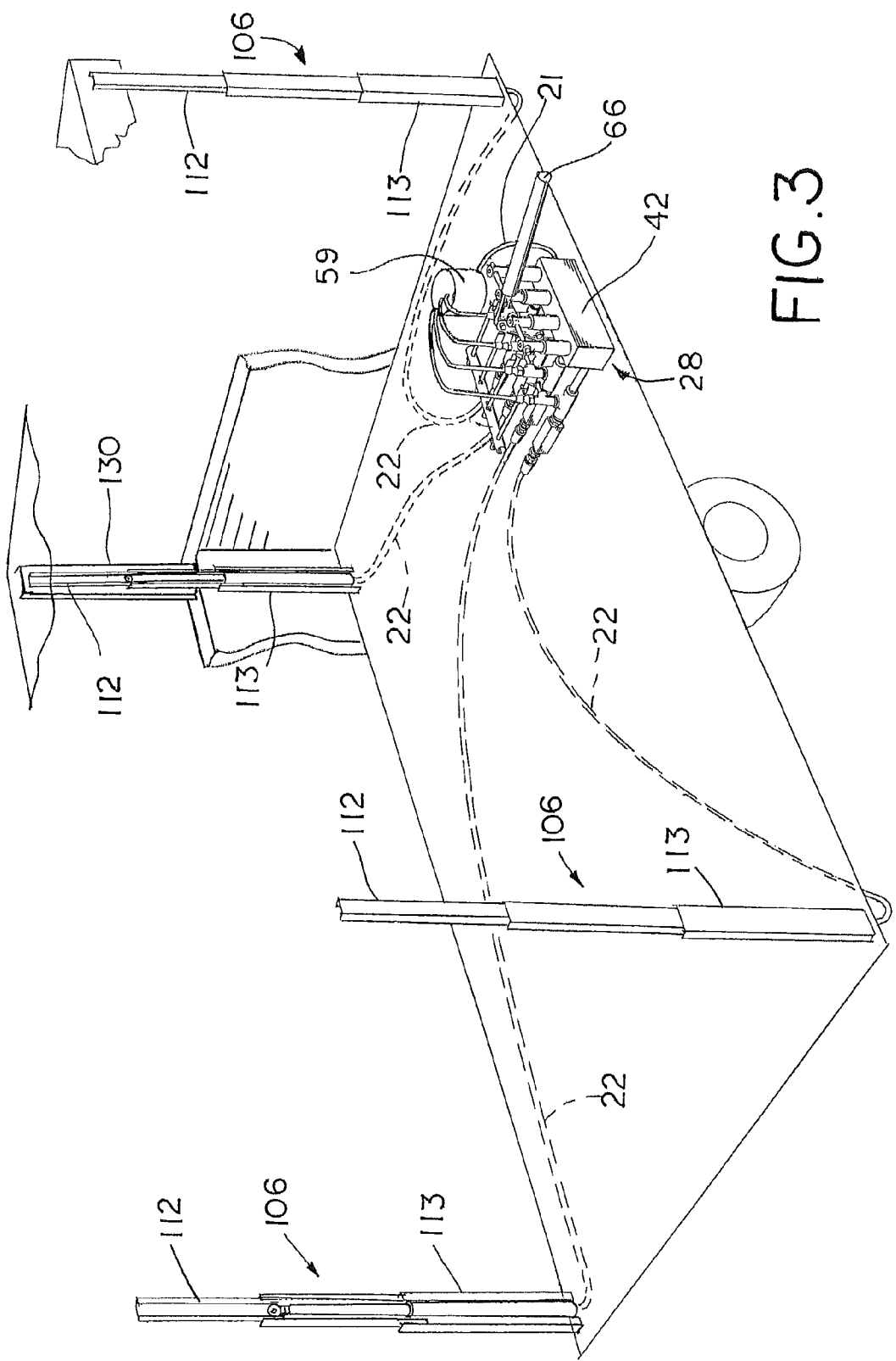
FIG. 3 is a perspective view of the camper shown in FIGS. 1 and 2 showing the fluid lines connected to lifting members in the corners of the liftable top, with the liftable top being fully raised.
Figure 4:
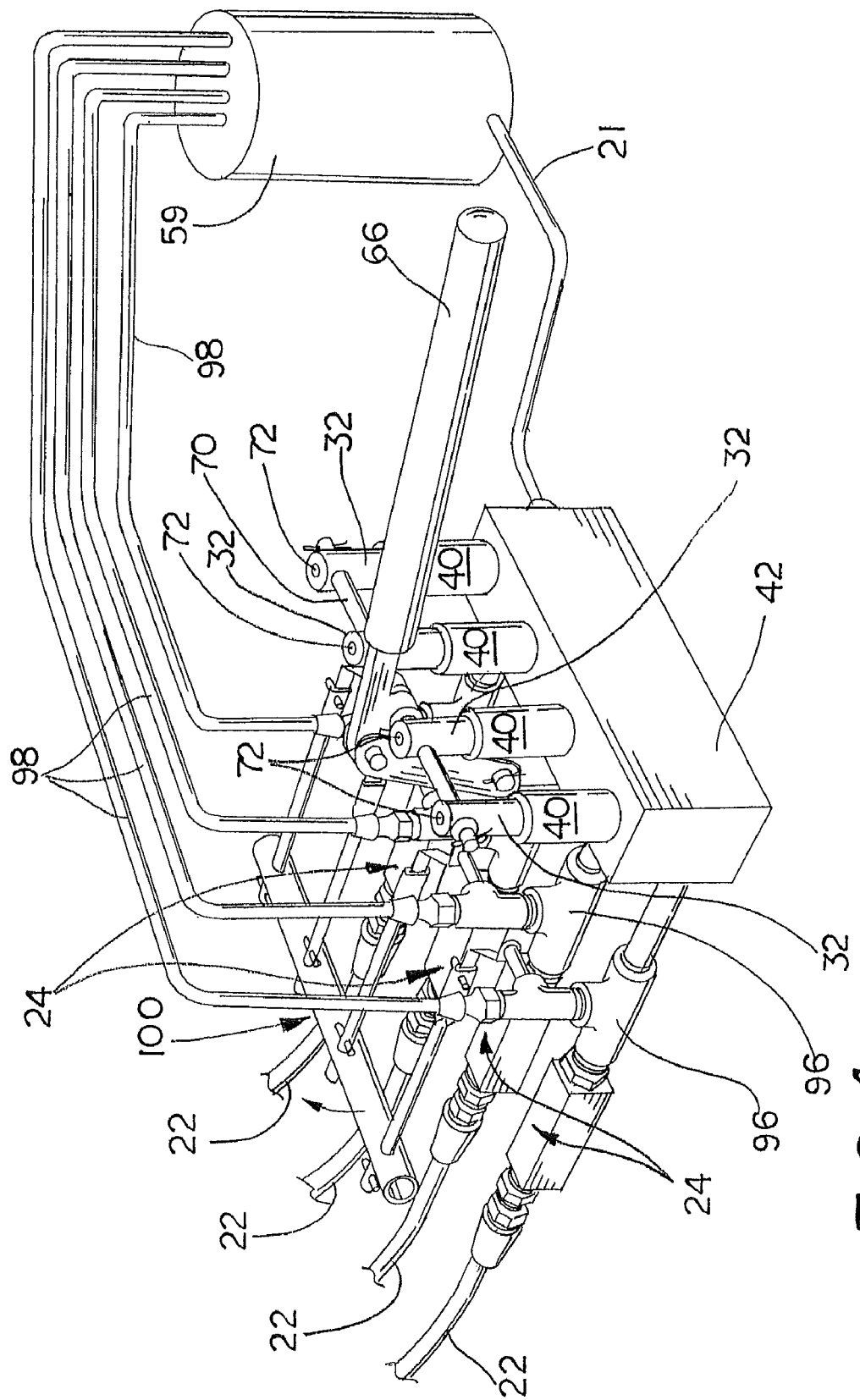
FIG. 4 is a perspective view of a first embodiment of a pump.
Figure 5:
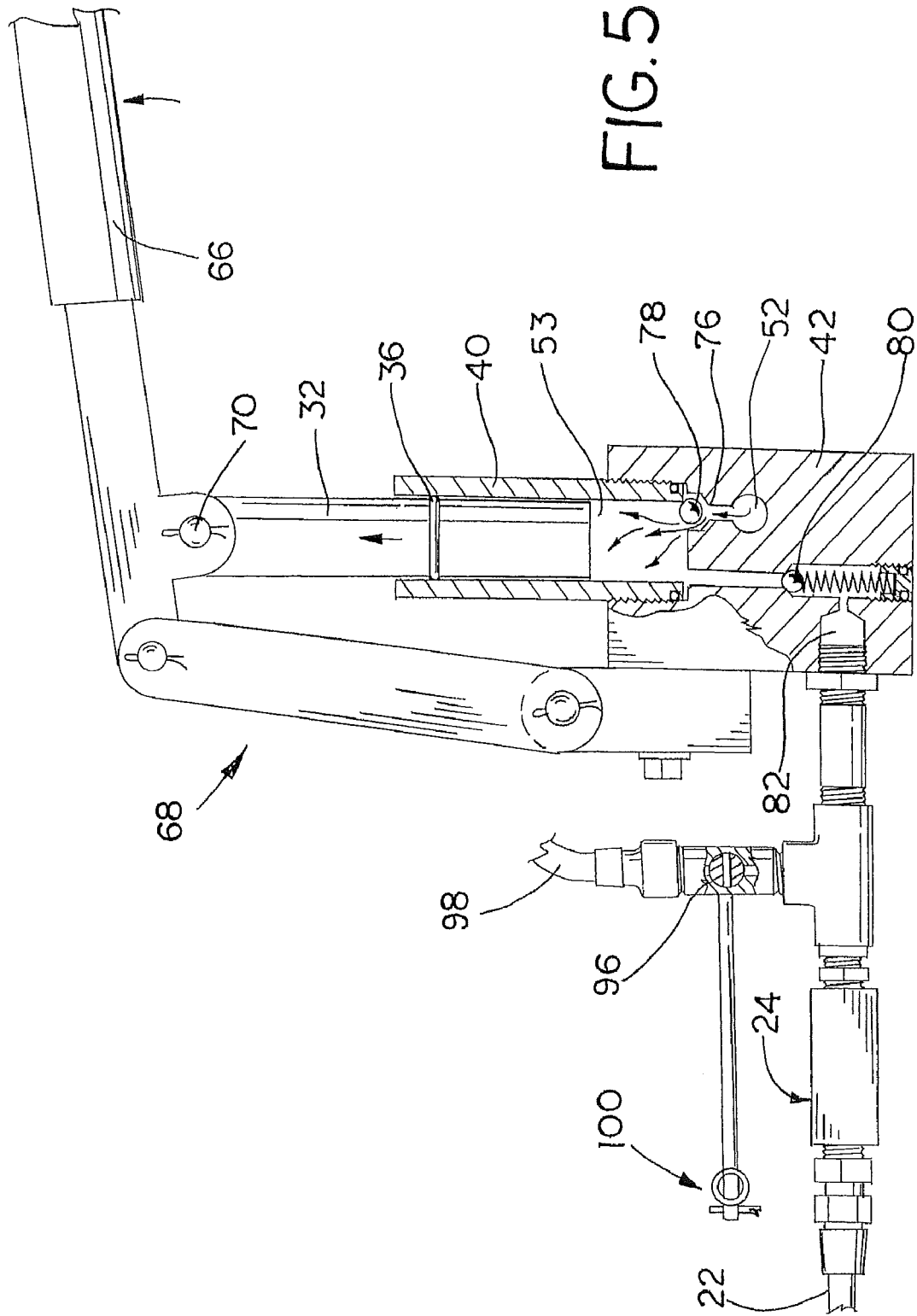
FIG. 5 is a section view of the pump shown in FIG. 4, showing the piston in the upstroke as the handle is raised.
Figure 6:
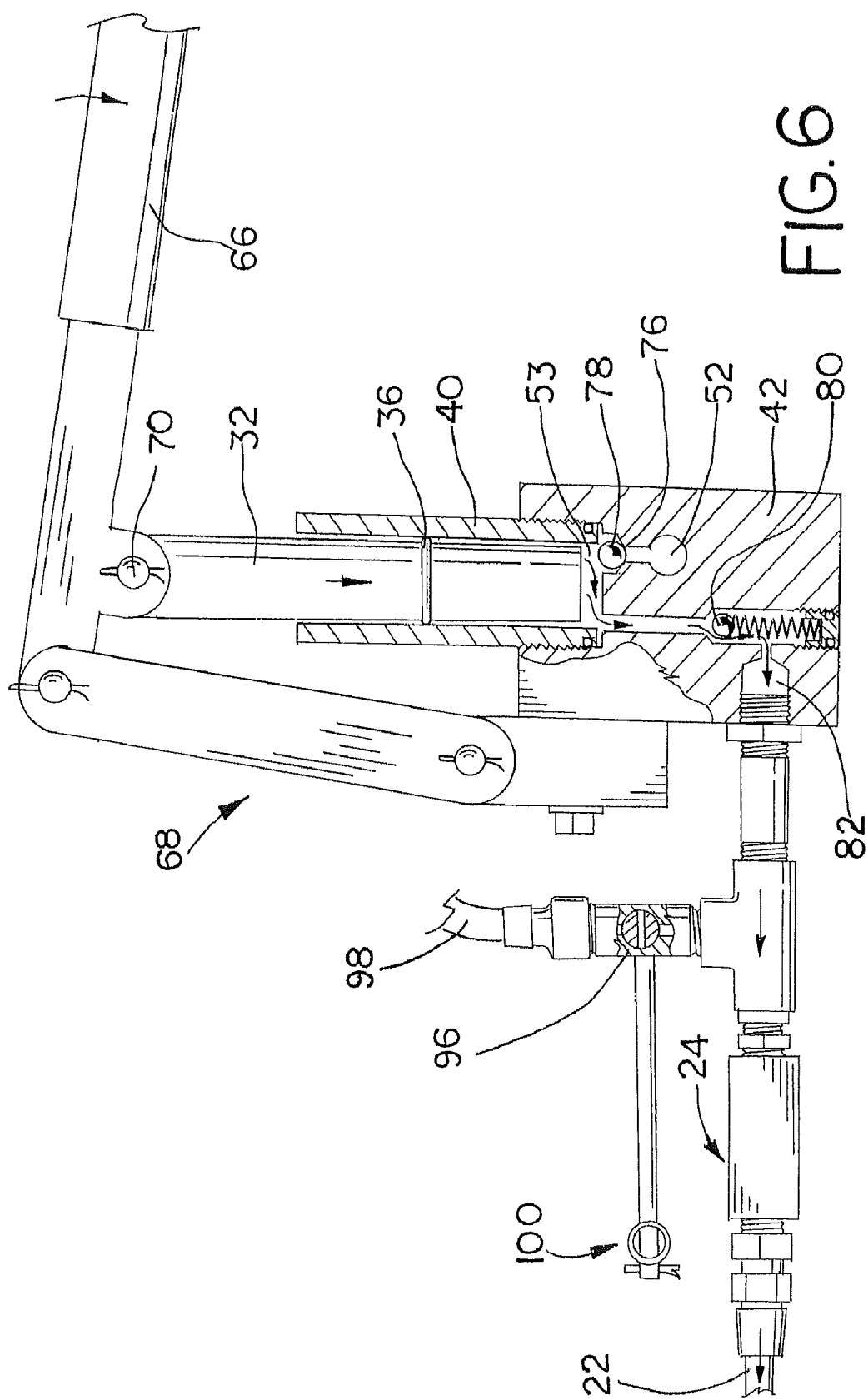
FIG. 6 is a section view of the pump shown in FIG. 4, showing the piston in the downstroke as the handle is lowered.
Figure 7:
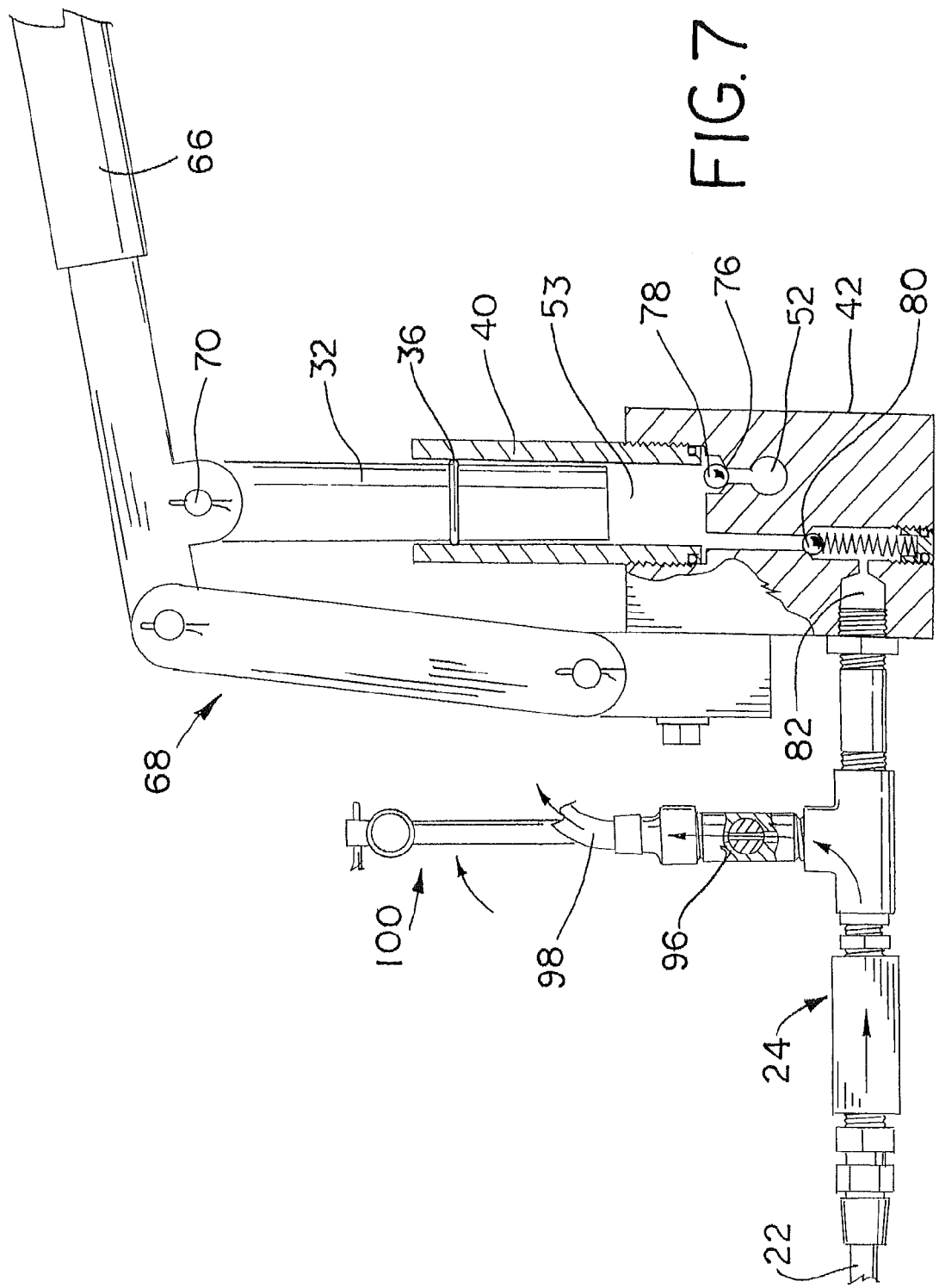
FIG. 7 is a section view of the pump shown in FIG. 4, showing a ball valve open returning fluid to the reservoir.
Figure 11:
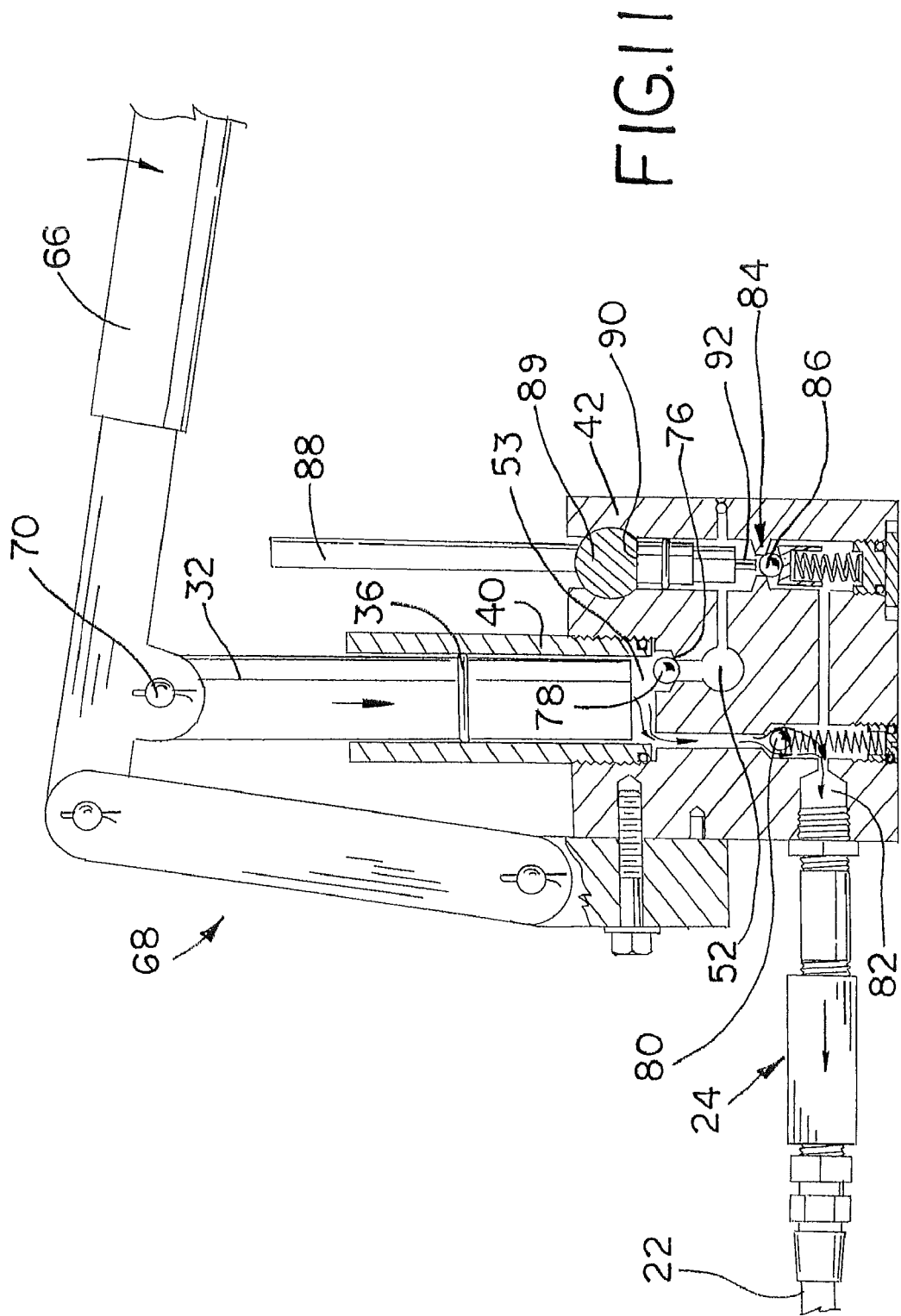
FIG. 11 is a section view of the pump shown in FIG. 10 with the piston on the downstroke.

A pump 28 is put into a camper 30, as shown in FIG. 3, and connected with fluid lines 22 to the lifting members 12. The pump 28 has four pistons 32 that are sealed with O-rings 36 and slide in cylinders 40. The cylinders 40 are threaded into a block 42. A removable handle 66 is connected to a linkage 68, which is connected to a connecting rod 70. The connecting rod 70 is received in each of the four pistons 32. Set screws 72 are threaded into the ends of each piston 32 and are tightened until each piston 32 is tightened against the connecting rod 70, which removes any free play between the connecting rod 70 and pistons 32. When the handle 66 is raised, the linkage 68 lifts the connecting rod 70 and raises all of the pistons 32 at the same time. When the handle 66 is lowered, the pistons 32 are lowered at the same time. The set screws 72 tightened onto the connecting rod 70 ensure that each time the handle 66 is raised or lowered, the pistons 32 travel the same amount. When a piston 32 is raised, fluid is drawn into the pump 28 through an inlet hole 52 which is connected to a reservoir 59 with an inlet fluid line 21. As fluid is drawn through the inlet hole 52, a first ball 78 lifts from an inlet seat 76 to allow fluid to pass into the chamber 53 formed by the piston 32 in its cylinder 40. When the piston 32 travels downward, as shown in FIGS. 6 and 11, the first ball 78 is forced into the inlet seat 76 preventing flow of fluid back into the inlet hole 52 while fluid is forced past a second ball 80 toward an outlet 82 of the pump connected to the chamber 53. Each of the four outlets 82 are only connected to one chamber 53 and are independent of all other chambers 53 of the pump 28. The pump 28, shown in FIGS. 4, 5, 6, and 7, is a first embodiment of the pump 28 that serves only the function of a pump.

Figure 10:
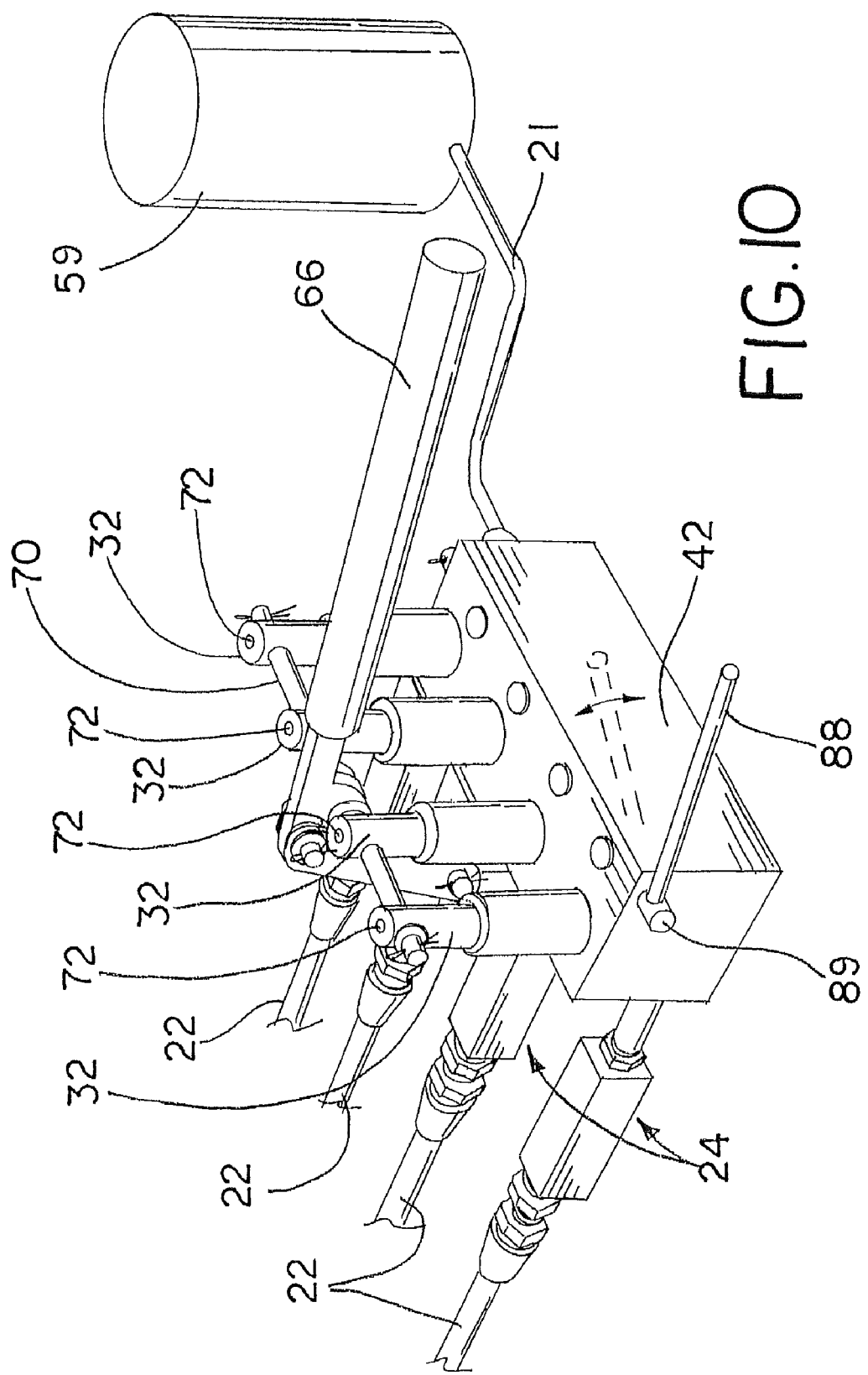
FIG. 10 is a perspective of a second embodiment pump.
Figure 12:
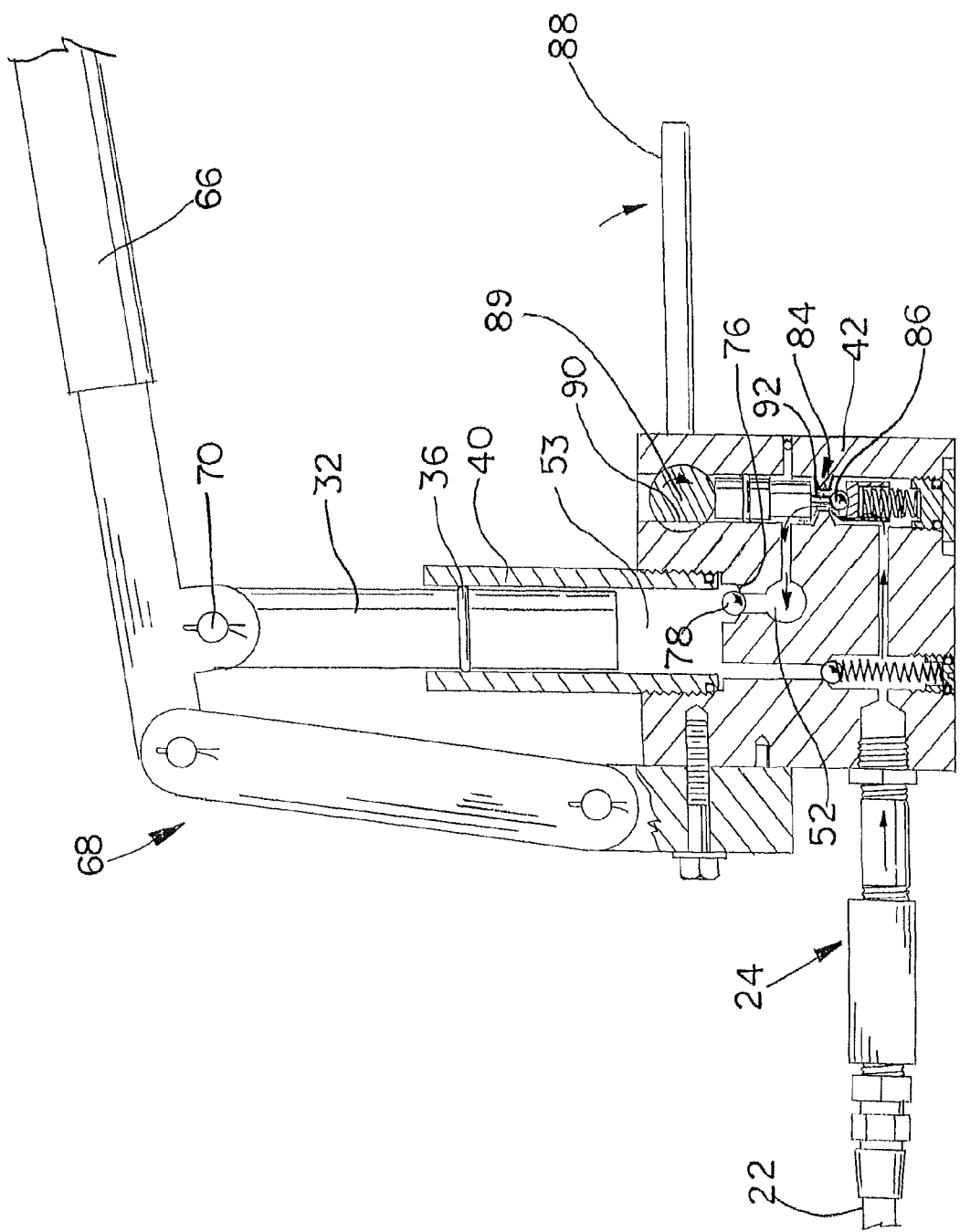
FIG. 12 is a section view of the pump shown in FIG. 11 with the cams engaged to activate pins which release fluid back to the reservoir.

The second embodiment shown in FIGS. 10, 11, and 12, in addition to being a pump, contains a set of four pressure release valves 84 connected to each fluid line 22. In the second embodiment, pressurized fluid in communication to the pump 28 through the fluid lines 22 is prevented from flowing back to the reservoir through the pump by the second ball 80 and a third ball 86. When a user desires to return pressurized fluid from the four lifting members 12 to the reservoir 59, a handle 88 attached to a cam rod 89 having four cams 90 may be rotated which moves a set of pins 92 downward, thereby pushing the third ball 86 from its seat and allowing pressurized fluid to return to the inlet hole 52. Each pin 92 is associated with a single outlet 82. The cam rod 89 moves all four pins 92 at the same time.

Figure 8:
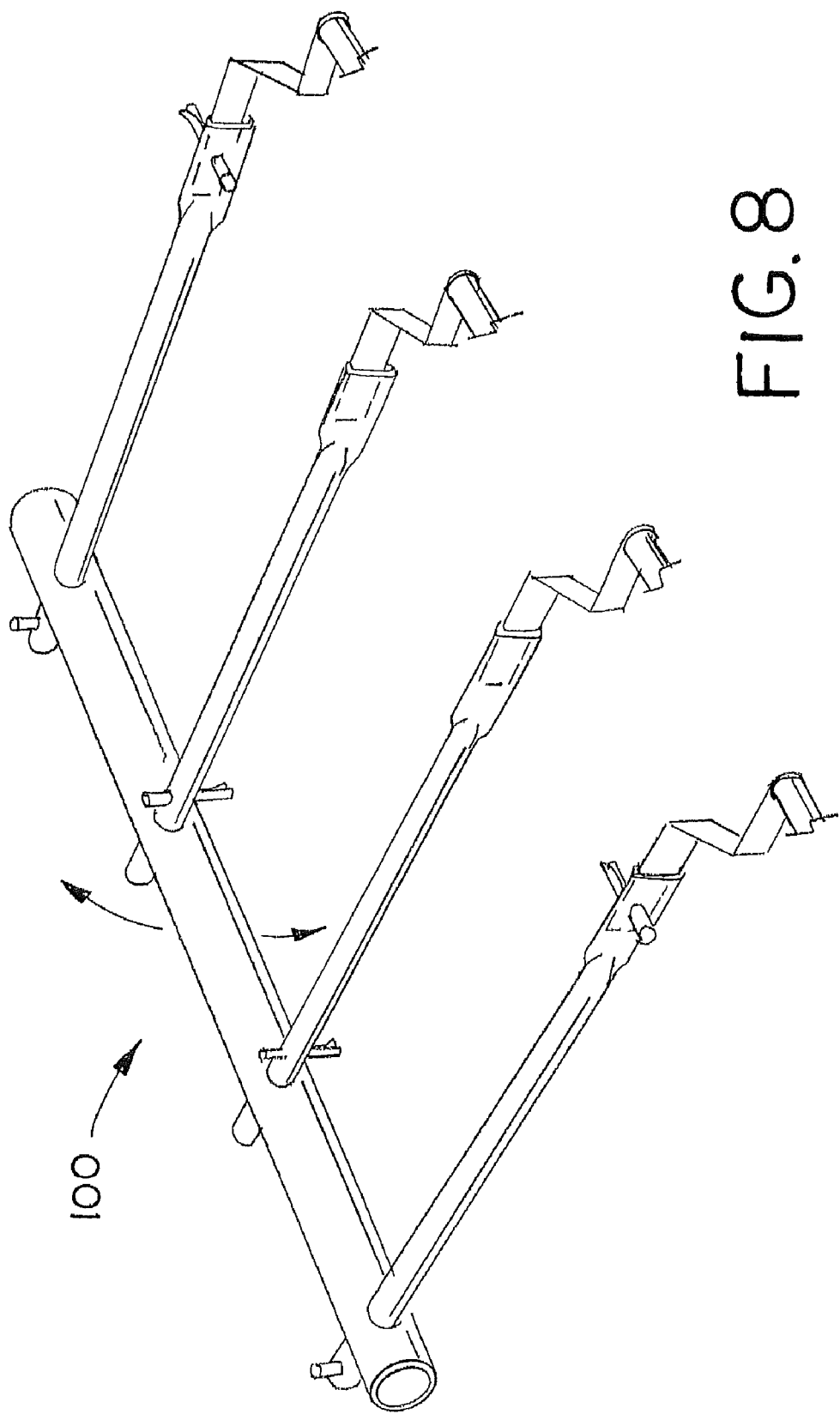
FIG. 8 is a perspective view of the handle that attaches to the ball valves.
Figure 9:
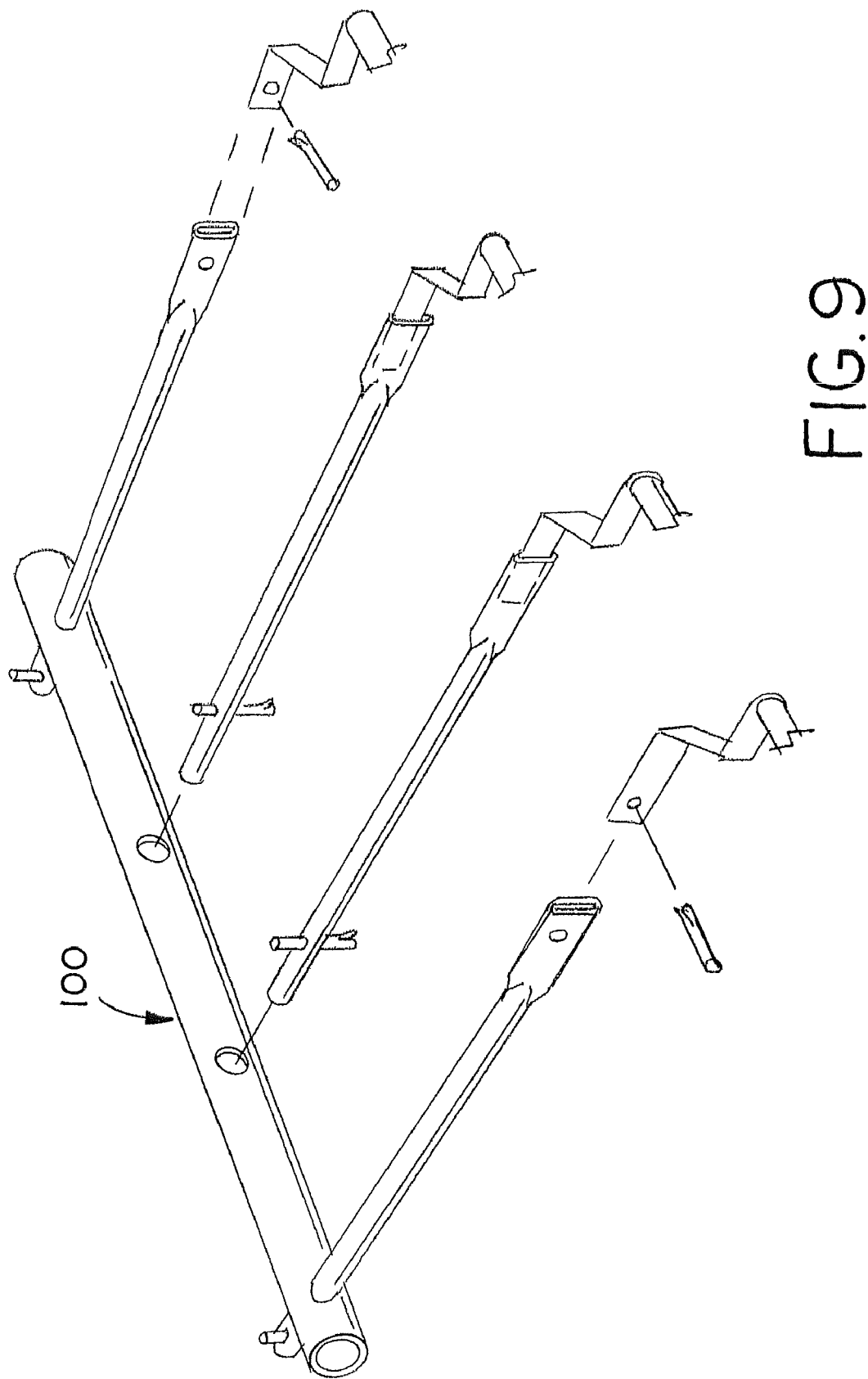
FIG. 9 is a perspective view of the handle shown in FIG. 8 partially disassembled.

When the first embodiment of the pump 28 is used, fluid is returned to the reservoir 59 through the use of ball valves 96. Each fluid line 22 has a ball valve 96 between the pump 28 and a lifting member 12. A second fluid line 98 is attached to each ball valve 96 and is connected to the reservoir 59. Each ball valve is connected to a handle 100 that simultaneously opens and closes all of the ball valves 96. The handle 100, as shown in FIG. 8, may be disassembled, as shown in FIG. 9, to open or close individual ball valves 96.

As fluid is communicated from the pump 28 it is pushed into the lifting members 12. The cylinder 18 of the lifting member 12 rests on a frame bracket 105 of the camper 30. The piston 16 and cylinder 18 are surrounded by telescoping members 106, as shown in FIG. 3. The piston 16 carries a pulley 108 on its upper end and the pulley 108 receives a cable 110. The cable 110 is locked near the bottom of the cylinder into a plate 111, and also locked into the uppermost telescoping member 112. The uppermost telescoping member 112 is affixed to the camper top 14 and the lowermost telescoping member 113 is held by a tab 118 locked into the plate 111 by a pin 120. As fluid enters the lifting member 12, the piston 16 extends and raises the pulley 108. This pulls the cable 110 upward, and raises the top 14.

Figure 13:
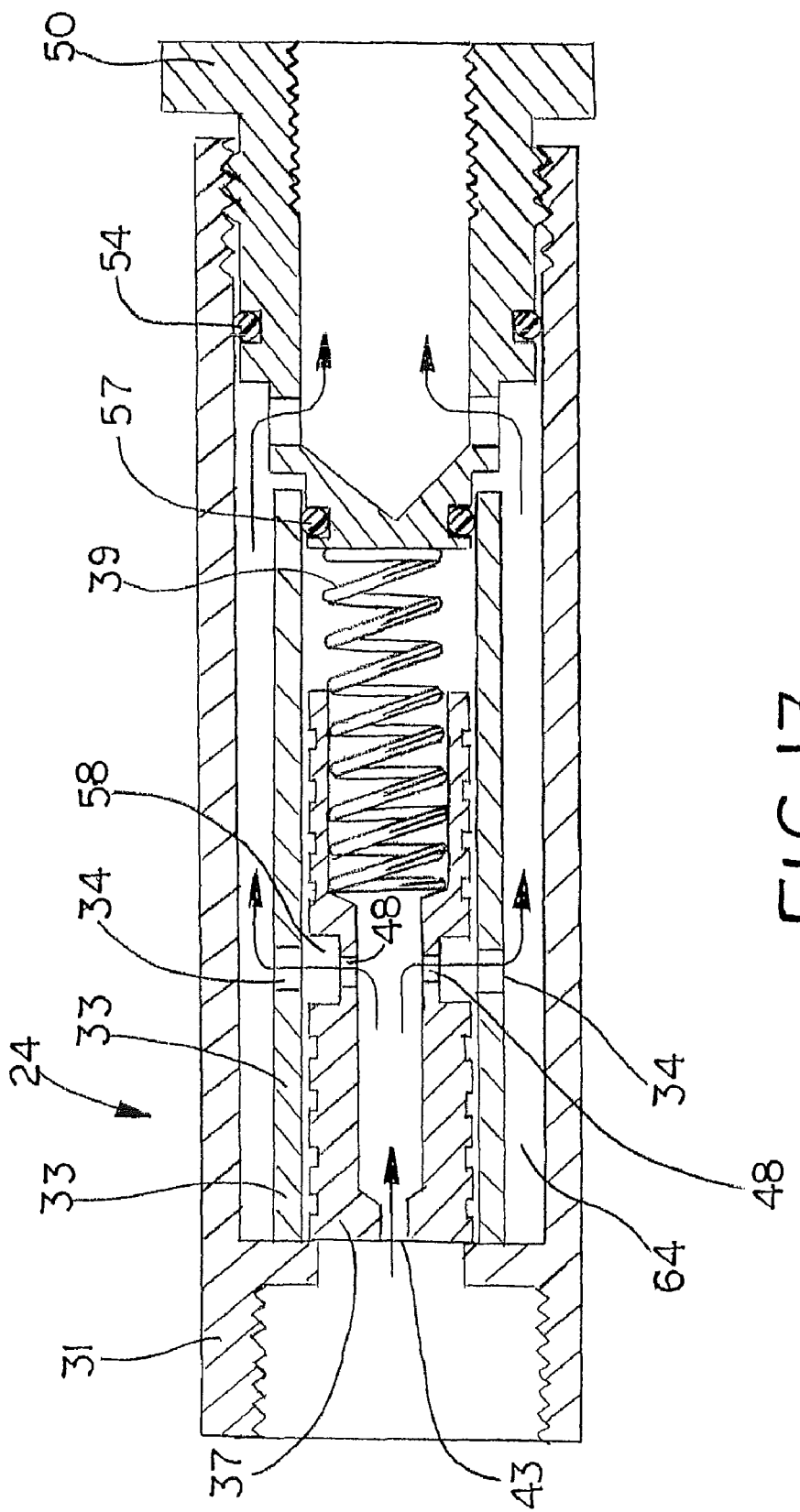
FIG. 13 is a section view of the flow control valve.
Figure 14:
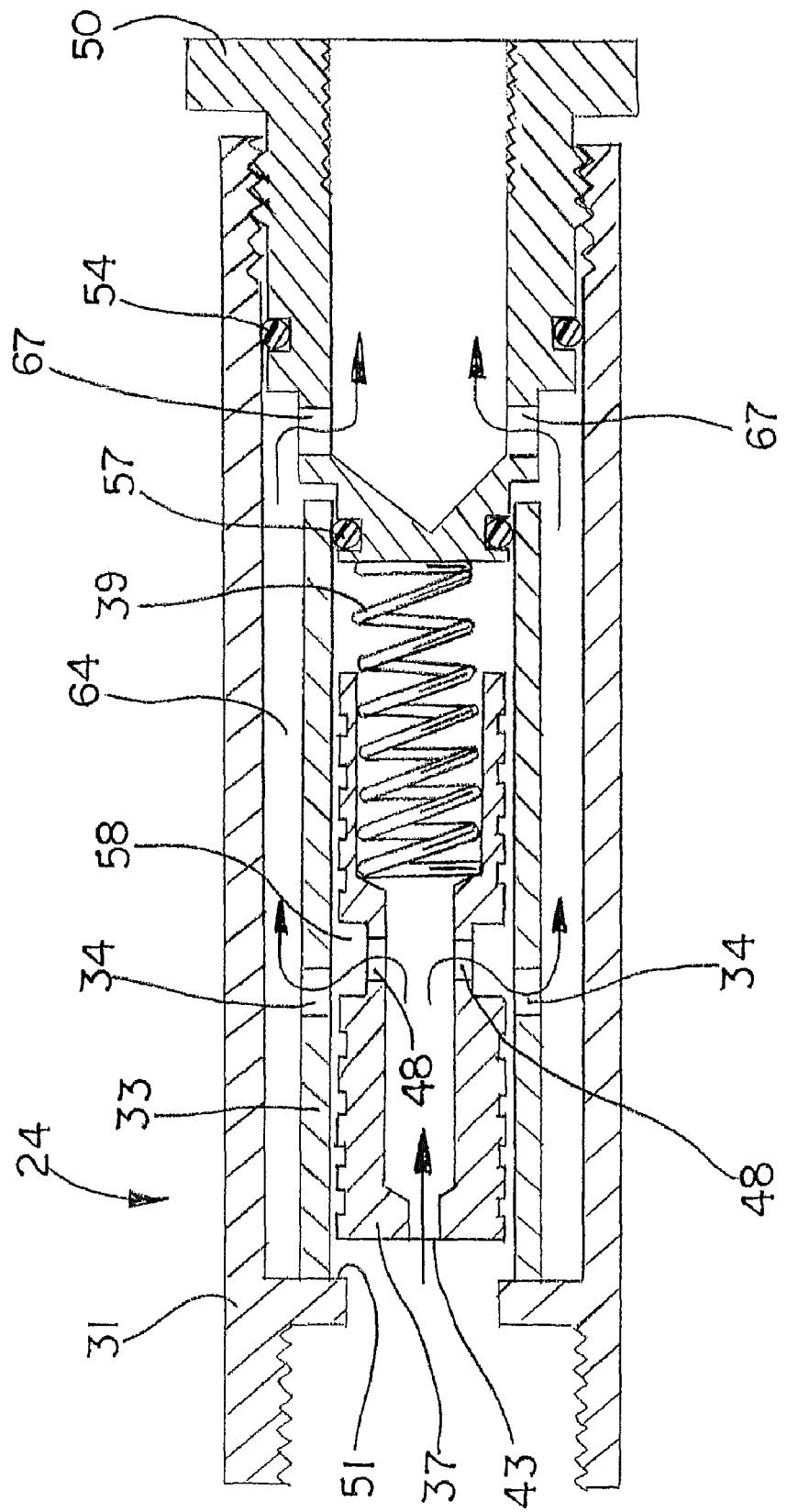
FIG. 14 is a section view of the flow control valve with the spool in its equilibrium position.
Figure 15:
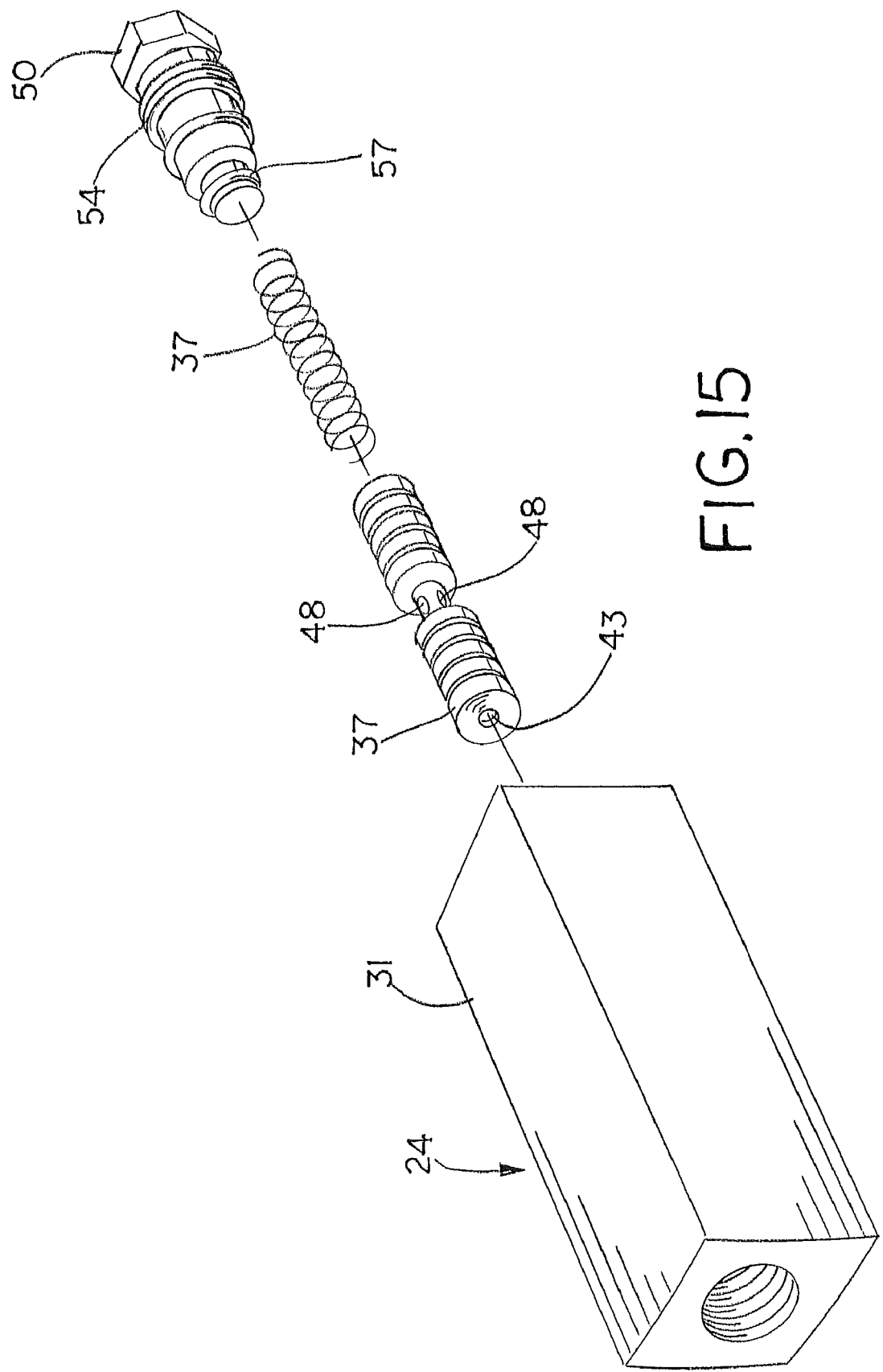
FIG. 15 is an exploded perspective view of the flow control valve shown in FIGS. 13 and 14.
Figure 16:
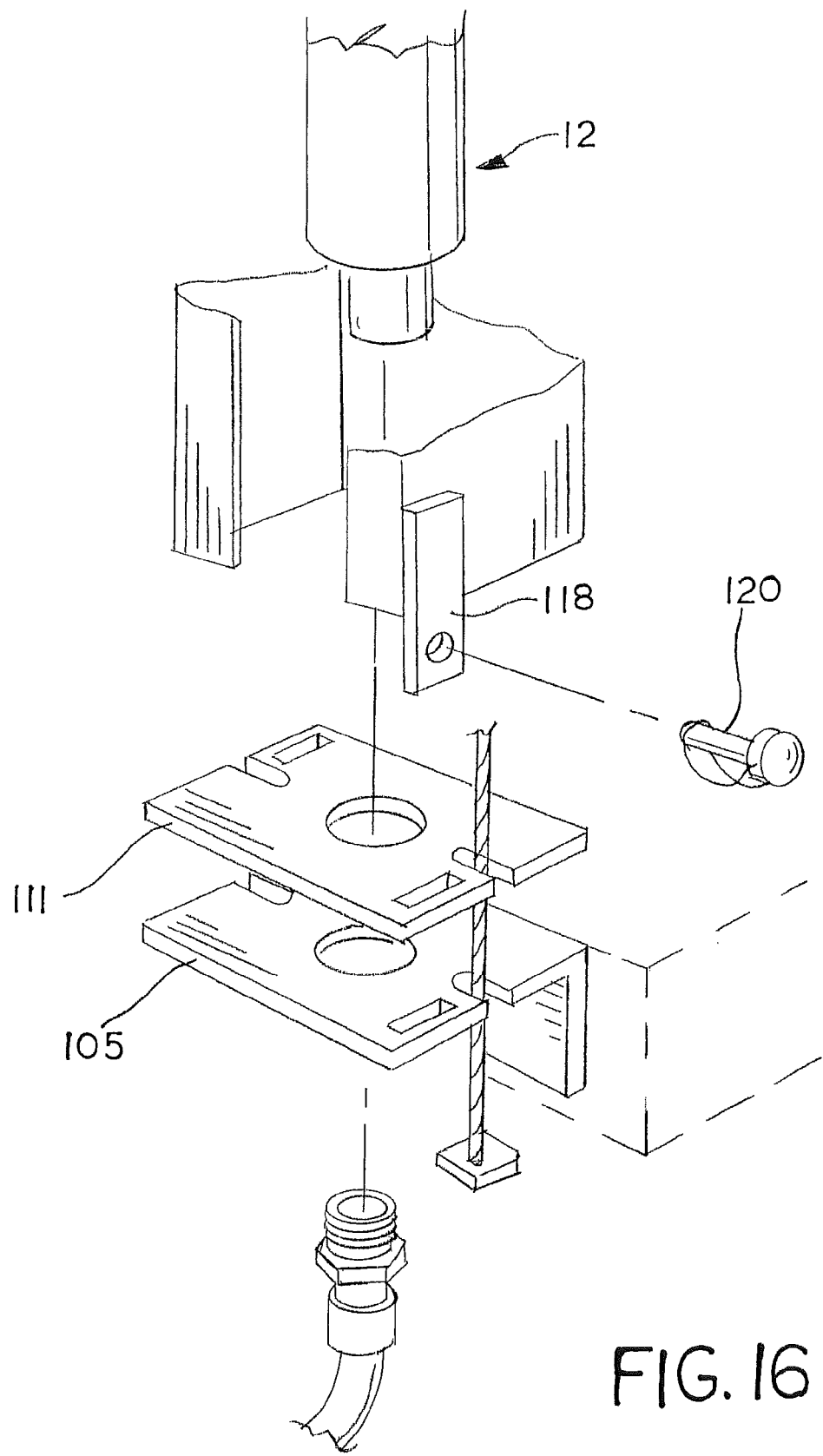
FIG. 16 is an exploded perspective view of the lower end of a lifting member as it is mounted in a camper.
Figure 17:
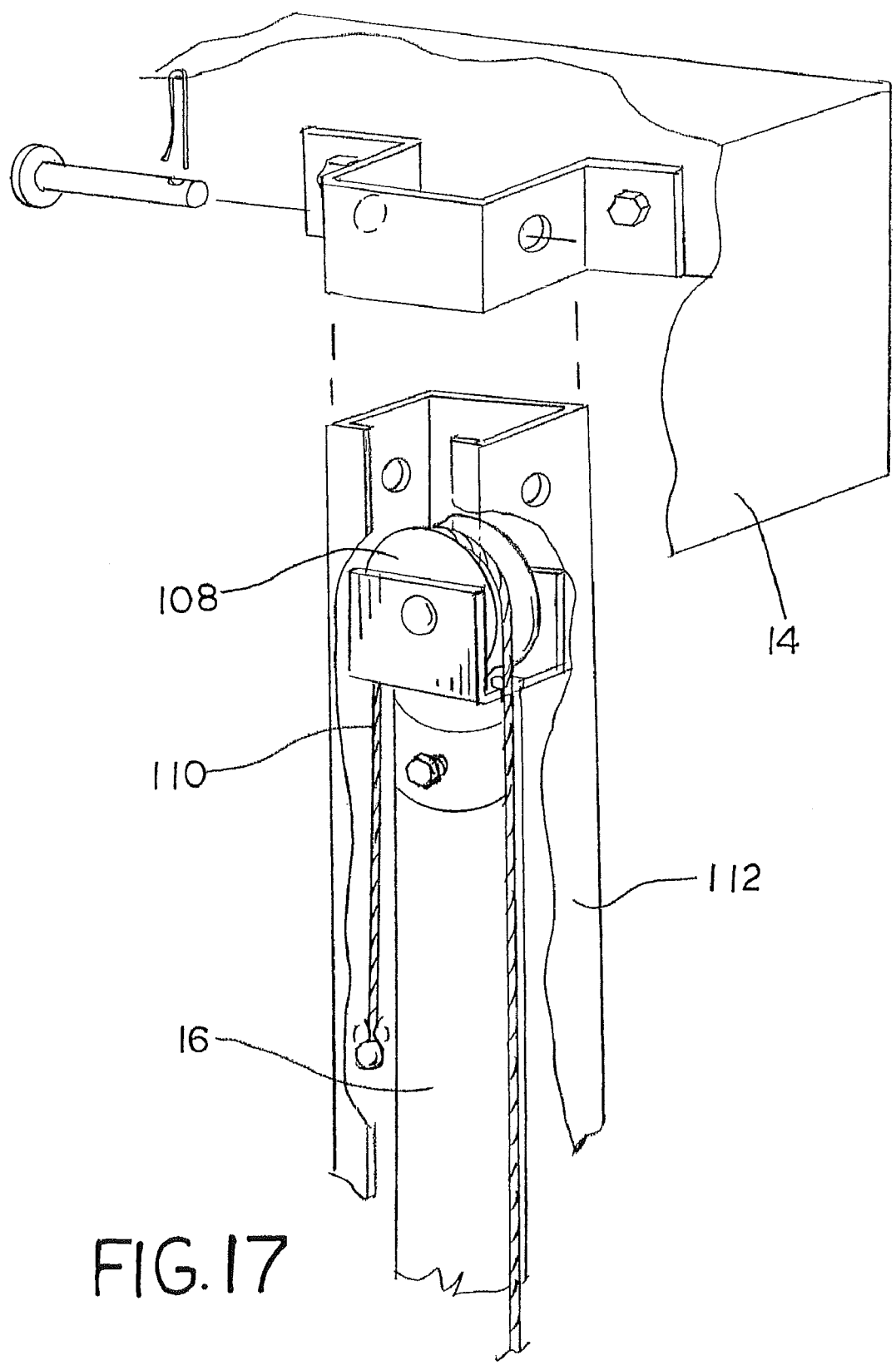
FIG. 17 is a perspective view of the upper end of a lifting member, shown in FIG. 16, as it is mounted in a camper.

Each of the fluid lines 22 are connected to a flow control valve 24, as shown in FIGS. 4, 5, 6, 7, 11, 12. The flow control valve 24 limits the rate of fluid flow leaving the chamber 20 of the lifting member 12 to which it is connected. The flow control valve 24 has a housing 31 that has an inner sleeve 33 mounted therein. The inner sleeve 33 has holes 34 through which fluid may pass. A spool 37 is slidably retained in the inner sleeve 33. The spool 37 receives a spring 39 in one end. The opposite end of the spool 37 has an orifice 43 that communicates fluid through the center of the spool 37, and out holes 48 in the spool. The spring 39 presses against an end plug 50 received in the downstream end of the housing 31 to urge the spool 37 against an inner face 51 in the housing 31. The end plug 50 has a first O-ring 57 that seals against the inner sleeve 33 and a second O-ring 54 that seals against housing 31. The first O-ring 57 seals a first chamber 58 that is defined by the inner face 51 of the housing 31, the inner sleeve 33 and the end plug 50. Holes 34 in the inner sleeve 33 allow fluid to pass from the first chamber 58. The second O-ring 54 seals a second chamber 64 defined by the housing 31, the inner sleeve 33 and the end plug 50. Holes 67 in the end plug 50 allow fluid to pass from the second chamber 64 and out of the flow control valve 24. When fluid is discharged from a lifting member 12 it enters the flow control valve 24 through the orifice 43. The fluid is communicated through the center of the spool 37, through holes 48, then passes into the first chamber 58, out holes 34 in the inner sleeve 33 to the second chamber 64, and through holes 67 out of the flow control valve 24. The arrows in FIGS. 13 and 14 show the flow path through the flow control valve 24 when fluid is discharged from the lifting members 12. As fluid flow increases the spool 37 is pushed toward the end plug 50 which partially covers holes 34, thereby slowing the flow rate due to the restriction of the spool valve partially covering holes 34. The flow rate is slowed until the force on the spool 37 due to the fluid flow through the orifice 43 is equal to the spring force on the spool 37. When this occurs an equilibrium position of the spool 37 is established, which is shown in FIG. 14.

When a user of the camper 30 wishes to raise the top 14 he will attach the handle 66 to the linkage 68. The user will then raise and lower the handle 66 which forces fluid through the fluid lines 22 and into the respective lifting members 12 attached to each fluid line 22. Each lifting member 12 will raise by the same amount each time the handle 66 is lowered until the top 14 is fully raised. When the user has fully raised the top a safety piece 130 may be inserted around the telescoping members 106 to support the weight of the top 14 in case it were to be unexpectedly lowered as shown in FIG. 3. When the user wants to put the camper top 14 down he will then use the handle 100 to open the ball valves 96 if the first embodiment pump 28 is used. If the second embodiment pump 28 is used, the user will rotate the handle 88 by ninety degrees. The use of either will allow fluid to flow back to the reservoir 59. When this happens, the flow control valves 24 ensure that the fluid flow leaving the lifting members 12 is uniform even if one corner of the camper top 14 carries more weight than others. Having fluid leave all lifting members at the same rate will cause the top 14 to descend in a level manner and prevent binding. At any point during the lowering, the user can close the ball valves 96 with handle 100, or use the handle 88 to stop the fluid flow to the reservoir 59. This will stop the camper top 14 at any point between fully raised and fully lowered so that the user may have an opportunity to tuck in canvas sidewalls as the top 14 descends.

Variations from the described embodiments may be made by one skilled in the art without departing from the scope of the invention. The above described invention is not to be limited to the details given but may be modified within the scope of the following claims.

What is claimed is:

1. Mobile living quarters having a liftable top comprising a pump for communicating fluid through fluid lines, said pump including a plurality of pistons, each said piston slidably retained in a cylinder, each piston and cylinder forming a chamber for pumping fluid into said lines, each of said chambers connected to a single fluid line, said liftable top being supported by a plurality of lifting members including a piston slidably retained in a cylinder, said piston and cylinder forming a chamber for receiving or discharging fluid, said piston containing a bore along its entire axis, said bore receiving a plug, said plug located at the uppermost end of said piston external to said chamber, said plug releasably retained to permit bleeding of fluid from said chamber of said lifting member, said lifting members extending upon receipt of fluid and retracting upon discharging fluid, said fluid discharged at a rate which is a function of the weight borne by each said lifting member, each said lifting member connected to said pump through a fluid line in communication with said pump and terminating at said lifting member, each said fluid line including a flow control valve between said pump and said lifting member, said fluid communicated through said flow control valve to said lifting member connected to said pump, said fluid also communicated through said flow control valve when fluid is discharged from said lifting member, said flow control valve limiting the flow rate of said fluid to a constant predetermined rate when said fluid is discharged from said lifting member.

2. Mobile living quarters having a liftable top comprising a pump for communicating fluid through fluid lines, said pump including a plurality of pistons, each said piston slidably retained in a cylinder, each piston and cylinder forming a chamber for pumping fluid into said lines, each of said chambers connected to a single fluid line, said liftable top being supported by a plurality of lifting members including a piston slidably retained in a cylinder, said piston and cylinder forming a chamber for receiving or discharging fluid, said piston being surrounded by telescoping members in sliding engagement, an upper most telescoping member being affixed to said liftable top, said lifting members extending upon receipt of fluid and retracting upon discharging fluid, said fluid discharged at a rate which is a function of the weight borne by each said lifting member, each said lifting member connected to said pump through a fluid line in communication with said pump and terminating at said lifting member, each said fluid line including a flow control valve between said pump and said lifting member, said fluid communicated through said flow control valve to said lifting member connected to said pump, said fluid also communicated through said flow control valve when fluid is discharged from said lifting member, said flow control valve limiting the flow rate of said fluid to a constant predetermined rate when said fluid is discharged from said lifting member.

3. Mobile living quarters having a liftable top as claimed in claim 2, wherein said piston of said lifting member has a pulley attached to its uppermost end, a cable is received in said pulley, a first end of said cable being anchored on a structure fixed relative to the lowermost end of said lifting member, a second end of said cable affixed to an uppermost telescoping member so that when said lifting member extends, tension is produced in said cable to lift said liftable top.

4. Mobile living quarters having a liftable top as claimed in claim 2, including a safety member which may be placed over and around said telescoping members to support weight of said top as a backup to said lifting member.

5. Mobile living quarters having a top supported by multiple lifting members for raising the top when the living quarters is parked for use and lowering the top when the living quarters is moved, each of said lifting members being communicated to a pump, said pump including a plurality of pistons, each said piston slidably retained in a cylinder, each said piston and cylinder forming a chamber for pumping fluid into fluid lines wherein said top is raised by communicating fluid from said pump into said lifting members and lowered by discharging fluid from said lifting members, each of said lifting members discharging fluid at a rate which varies as a function of the weight borne by the corresponding lifting member, a valve controlling communication in said fluid lines and operable to selectively permit fluid to be admitted into and discharged from said lifting members, and a flow control valve limiting the rate of discharge from each of said lifting members as the top is lowered to limit tilting of the top.

6. Mobile living quarters having a top supported by multiple lifting members for raising the top when the living quarters is parked for use and lowering the top when the living quarters is moved, each of said lifting members being communicated to a pump through a corresponding one of multiple fluid lines, said lifting members including a piston slidably retained in a cylinder, said piston and cylinder forming a chamber for receiving or discharging fluid, said piston being surrounded by telescoping members in sliding engagement, an upper most telescoping member being affixed to said top, wherein said top is raised by communicating fluid from said pump into said lifting members and lowered by discharging fluid from said lifting members, each of said lifting members discharging fluid at a rate which varies as a function of the weight borne by the corresponding lifting member, a valve controlling communication in said fluid lines and operable to selectively permit fluid to be admitted into and discharged from said lifting members, and a flow control valve in communication with each lifting member limiting the rate of discharge from each of said lifting members as the top is lowered to limit tilting of the top.

7. Mobile living quarters having a liftable top as claimed in claim 6, including a safety member which may be placed over and around said telescoping members to support weight of said top as a backup to said lifting member.

8. Mobile living quarters having a top supported by multiple lifting members for raising the top when the living quarters is parked for use and lowering the top when the living quarters is moved, each of said lifting members being communicated to a pump through a corresponding one of multiple fluid lines, said lifting members including a piston slidably retained in a cylinder, said piston and cylinder forming a chamber for receiving or discharging fluid, said piston having a pulley attached to its uppermost end, a cable being received in said pulley, a first end of said cable being anchored on a structure fixed relative to the lowermost end of said lifting member, a second end of said cable affixed to an uppermost telescoping member so that when said lifting member extends tension is produced in said cable to lift said top, said top being raised by communicating fluid from said pump into said lifting members and lowered by discharging fluid from said lifting members, each of said lifting members discharging fluid at a rate which varies as a function of the weight borne by the corresponding lifting member, a valve controlling communication in said fluid lines and operable to selectively permit fluid to be admitted into and discharged from said lifting members, and a flow control valve in communication with each lifting member limiting the rate of discharge from each of said lifting members as the top is lowered to limit tilting of the top.

9. Mobile living quarters having a top supported by multiple lifting members for raising the top when the living quarters is parked for use and lowering the top when the living quarters is moved, each of said lifting members being communicated to a fluid pressure source through a corresponding one of multiple fluid lines wherein said top is raised by communicating fluid from said source into said lifting members and lowered by discharging fluid from said lifting members, each of said lifting members discharging fluid at a rate which varies as a function of the weight borne by the corresponding lifting member, a valve controlling communication in said fluid lines and operable to selectively permit fluid to be admitted into and discharged from said lifting members, and a flow control valve in communication with each lifting member limiting the rate of discharge from each of said lifting members as the top is lowered to limit tilting of the top, said flow control valve including a spool having an orifice, fluid flowable through said orifice, said spool valve movable such that movement of said spool restricts flow of fluid through said orifice.

* * * * *